United States Patent
Lu et al.

(10) Patent No.: US 10,616,119 B2
(45) Date of Patent: Apr. 7, 2020

(54) POLICY DETERMINING METHOD AND APPARATUS

(71) Applicant: Huawei Technologies Co., Ltd., Shenzhen (CN)

(72) Inventors: Wei Lu, Shanghai (CN); Yufang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/939,954

(22) Filed: Mar. 29, 2018

(65) Prior Publication Data
US 2018/0227235 A1  Aug. 9, 2018

Related U.S. Application Data

(63) Continuation of application No. PCT/CN2015/091319, filed on Sep. 30, 2015.

(51) Int. Cl.
*H04L 12/851* (2013.01)
*H04L 12/825* (2013.01)
*H04W 28/02* (2009.01)
*H04L 12/24* (2006.01)
(Continued)

(52) U.S. Cl.
CPC .......... *H04L 47/24* (2013.01); *H04L 41/5003* (2013.01); *H04L 43/0888* (2013.01);
(Continued)

(58) Field of Classification Search
CPC ............... H04L 41/5003; H04L 43/062; H04L 43/0888; H04L 43/16; H04L 47/24;
(Continued)

(56) References Cited

U.S. PATENT DOCUMENTS 8,665,717 B2  3/2014  Kotecha et al.
8,891,365 B2  11/2014  Lee et al.
(Continued)

FOREIGN PATENT DOCUMENTS

CN  1859195 A  11/2006
CN  101370263 A  2/2009
(Continued)

OTHER PUBLICATIONS

EP/1590511.9-1215, Office Action, dated Jun. 19, 2019.

*Primary Examiner* — Kan Yuen
(74) *Attorney, Agent, or Firm* — Leydig, Voit & Mayer, Ltd.

(57) ABSTRACT

Embodiments of the present disclosure provide a policy determining method and apparatus, and relate to the field of communications technologies. The method includes: obtaining transmission quality of a downlink data flow; and determining a quality of service policy for the downlink data flow according to the transmission quality of the downlink data flow, where the quality of service policy is used to adjust the transmission quality of the downlink data flow. In the technical solution of the embodiments of the present disclosure, the obtained transmission quality of the downlink data flow can reflect an actual network environment. Therefore, the quality of service policy can be determined according to the actual network environment, so that the transmission quality of the downlink data flow can be improved and user experience can be improved.

15 Claims, 6 Drawing Sheets

(51) Int. Cl.
*H04L 12/26* (2006.01)
*H04L 12/927* (2013.01)

(52) U.S. Cl.
CPC .......... *H04L 43/0894* (2013.01); *H04L 43/16* (2013.01); *H04L 47/2425* (2013.01); *H04L 47/26* (2013.01); *H04L 47/805* (2013.01); *H04W 28/0268* (2013.01); *H04L 43/062* (2013.01)

(58) Field of Classification Search
CPC ... H04L 47/2425; H04L 47/26; H04L 47/263; H04L 47/805; H04L 5/006; H04W 28/0268; H04W 28/22; H04W 72/0493
See application file for complete search history.

(56) References Cited

U.S. PATENT DOCUMENTS

| | | | | |
|---|---|---|---|---|
| 2007/0153685 | A1* | 7/2007 | Moon | H04W 8/26 370/229 |
| 2008/0273553 | A1 | 11/2008 | Wang et al. | |
| 2012/0002541 | A1* | 1/2012 | Lee | H04L 47/805 370/230 |
| 2012/0182868 | A1 | 7/2012 | Lovsen et al. | |
| 2015/0163813 | A1* | 6/2015 | Zhang | H04W 72/0493 370/329 |
| 2015/0195746 | A1* | 7/2015 | Franklin | H04W 28/22 370/230 |
| 2016/0050580 | A1* | 2/2016 | Bosch | H04L 69/22 370/252 |
| 2017/0150394 | A1 | 5/2017 | Fan et al. | |

FOREIGN PATENT DOCUMENTS

| | | |
|---|---|---|
| CN | 101447917 A | 6/2009 |
| CN | 102811204 A | 12/2012 |
| CN | 103973588 A | 8/2014 |
| CN | 104301250 A | 1/2015 |
| EP | 2611234 A1 | 7/2013 |
| EP | 2645764 A1 | 10/2013 |
| EP | 2800328 A2 | 11/2014 |

\* cited by examiner

- PRIOR ART -

POLICY DETERMINING METHOD AND APPARATUS

CROSS-REFERENCE TO RELATED APPLICATIONS

This application is a continuation of International Application No. PCT/CN2015/091319 filed on Sep. 30, 2015, the disclosure of which is hereby incorporated by reference in its entirety.

TECHNICAL FIELD

The present disclosure relates to the field of communications technologies, and in particular, to a policy determining method and apparatus.

BACKGROUND

To face a challenge brought by wireless broadband technologies and keep advantages of a 3rd Generation Partnership Project (3GPP) network, the Long Term Evolution (LTE) project of a mobile communications network is formulated in the 3GPP. Under the direction of the Long Term Evolution project, a new mobile communications network architecture is defined, that is, an architecture of a System Architecture Evolution (SAE) network system.

FIG. 1 is a schematic architectural diagram of a SAE network system in the prior art. As shown in FIG. 1, when user equipment (UE) accesses the SAE network system by using a serving general packet radio system support node (SGSN), the UE may access a serving gateway (SGW) using an S4 interface, and then access a packet data network gateway (PDN-GW or PGW) using an S5 interface. Alternatively, the UE may directly access the PGW using a Gn/Gp interface. Functions of main network elements in the SAE network system are described as follows:

The mobility management entity (MME) is mainly responsible for functions in an evolved universal mobile telecommunications system terrestrial radio access network (E-UTRAN), such as UE mobility management, session management, encryption and integrity protection of non-access stratum (NAS) signaling, temporary identifier allocation for UE, and PGW and SGW selection. The MME corresponds to a control plane part of an SGSN in the Universal Mobile Telecommunications System (UMTS).

The SGW is mainly responsible for relaying a user service flow between the UE and the PGW, and is used as an anchor during handover between base stations.

The PGW is mainly responsible for user address allocation, execution of policy control, execution of a charging rule, and a function related to lawful interception.

The policy and charging rules function (PCRF) entity determines a corresponding policy according to limitations of a user access network, an operator policy, user subscription data, information about a service currently performed by a user, and the like, and provides the policy for a transmission gateway for execution, so as to implement policy charging control.

The home subscriber server (HSS) is responsible for storing user subscription information.

The operator's Internet Protocol (IP) services are implemented in an LTE network by using an IP multimedia subsystem (IMS) network. In addition, a packet switched streaming service (PSS) technology is a technology that is defined in the 3GPP and that is used for providing a streaming media service for the user. A PSS network architecture mainly includes a mobile terminal and a PSS server that is on a network side.

On the basis of the architecture of the SAE network system shown in FIG. 1, to detect a congestion status of a cell in an access network, a radio access network congestion awareness function (RCAF) entity is introduced into the 3GPP. FIG. 2 is a schematic architectural diagram of a SAE network system with an RCAF entity. As shown in FIG. 2, the RCAF entity is connected to a radio access network (RAN) using an operation, administration and maintenance (OAM) system of a RAN, obtains a congestion status of a cell, and requests UE information or access point name (APN) information in the cell by using the MME or the SGSN. Then, the RCAF entity notifies the PCRF entity of a congestion status of a cell in which the UE is located. The architecture shown in FIG. 2 further includes a traffic detection function (TDF) entity and a policy and charging enforcement function (PCEF) entity. The TDF entity is mainly used to detect network traffic. The PCEF entity and the PGW may be integrated into a network device. The PCEF entity is mainly used to execute the policy determined by the PCRF entity.

In the prior art, the PCRF entity formulates a data flow transmission policy only according to information such as an operator policy or user subscription data, and therefore user experience may be poor.

SUMMARY

Embodiments of the present disclosure provide a policy determining method and apparatus, to resolve a problem of poor user experience caused when a PCRF entity formulates a data flow transmission policy only according to information such as an operator policy or user subscription data.

According to a first aspect, a policy determining method is provided, and the method includes:

obtaining transmission quality of a downlink data flow; and determining a quality of service policy for the downlink data flow according to the transmission quality of the downlink data flow, where the quality of service policy is used to adjust the transmission quality of the downlink data flow.

According to a first implementation of the first aspect, the transmission quality of the downlink data flow includes a transmission bit rate of the downlink data flow, and the obtaining transmission quality of a downlink data flow includes: receiving the transmission bit rate that is of the downlink data flow and that is sent by a packet data network gateway PGW, a policy and charging enforcement function PCEF entity, or a traffic detection function TDF entity.

In this implementation, the transmission bit rate of the downlink data flow is detected by the PGW, the PCEF entity, or the TDF entity. Therefore, only a core network device needs to participate in determining the quality of service policy for the downlink data flow, so that the transmission quality of the downlink data flow can be improved by using the quality of service policy while relatively small impact is exerted on an entire system, thereby improving user experience.

According to a second implementation of the first aspect, before the receiving the transmission bit rate that is of the downlink data flow and that is sent by a packet data network gateway PGW, a policy and charging enforcement function PCEF entity, or a traffic detection function TDF entity, the method further includes: sending first instruction information to the PGW, the PCEF entity, or the TDF entity, where the first instruction information is used to instruct the PGW, the PCEF entity, or the TDF entity to detect the transmission bit rate of the downlink data flow.

According to a third implementation of the first aspect, the transmission quality further includes information of channel quality fed back to an access network device by a terminal that receives the downlink data flow, and the obtaining transmission quality of a downlink data flow further includes: receiving the information of channel quality sent by the access network device.

According to a fourth implementation of the first aspect, before the receiving the information of channel quality sent by the access network device, the method further includes: sending second instruction information to the access network device, where the second instruction information is used to instruct the access network device to report the information of channel quality.

According to a fifth implementation of the first aspect, the transmission quality of the downlink data flow includes a transmission bit rate of the downlink data flow, and the obtaining transmission quality of a downlink data flow includes: receiving the transmission bit rate that is of the downlink data flow and that is sent by an access network device.

In this implementation, the transmission bit rate of the downlink data flow is detected by the access network device. Therefore, the detected transmission bit rate of the downlink data flow is relatively accurate, so that the quality of service policy can be relatively accurately determined. This improves the transmission quality of the downlink data flow and improves user experience.

According to a sixth implementation of the first aspect, the downlink data flow carries a specified identifier, and the specified identifier is used to instruct the access network device to detect the transmission bit rate of the downlink data flow.

According to a seventh implementation of the first aspect, the specified identifier is generated by a PCEF entity or a TDF entity.

According to an eighth implementation of the first aspect, before the receiving the transmission bit rate that is of the downlink data flow and that is sent by an access network device, the method further includes: sending third instruction information to the PCEF entity or the TDF entity, where the third instruction information is used to instruct the PCEF entity or the TDF entity to identify the downlink data flow, and the identified downlink data flow carries the specified identifier.

According to a ninth implementation of the first aspect, the determining a quality of service policy for the downlink data flow according to the transmission quality of the downlink data flow includes: determining the quality of service policy when the transmission bit rate of the downlink data flow is less than a preset transmission bit rate.

According to a tenth implementation of the first aspect, the determining a quality of service policy for the downlink data flow according to the transmission quality of the downlink data flow includes: determining the quality of service policy when the transmission bit rate of the downlink data flow is less than a preset transmission bit rate and the channel quality is better than preset channel quality.

According to a second aspect, a policy determining apparatus is provided, and the apparatus includes a processor and a network interface, where the processor is configured to: obtain transmission quality of a downlink data flow using the network interface; and determine a quality of service policy for the downlink data flow according to the transmission quality of the downlink data flow, where the quality of service policy is used to adjust the transmission quality of the downlink data flow.

According to a first implementation of the second aspect, the processor is configured to receive, using the network interface, a transmission bit rate that is of the downlink data flow and that is sent by a packet data network gateway PGW, a policy and charging enforcement function PCEF entity, or a traffic detection function TDF entity.

According to a second implementation of the second aspect, the processor is further configured to send first instruction information to the PGW, the PCEF entity, or the TDF entity by using the network interface before receiving, by using the network interface, the transmission bit rate that is of the downlink data flow and that is sent by the PGW, the PCEF entity, or the TDF entity, and the first instruction information is used to instruct the PCEF entity or the TDF entity to detect the transmission bit rate of the downlink data flow.

According to a third implementation of the second aspect, the processor is further configured to receive, using the network interface, information of channel quality that is sent by an access network device and fed back to the access network device by a terminal that receives the downlink data flow.

According to a fourth implementation of the second aspect, the processor is further configured to send second instruction information to the access network device using the network interface before receiving, using the network interface, the information of channel quality sent by the access network device, and the second instruction information is used to instruct the access network device to report the information of channel quality.

According to a fifth implementation of the second aspect, the processor is configured to receive, using the network interface, a transmission bit rate that is of the downlink data flow and that is sent by an access network device.

According to a sixth implementation of the second aspect, the processor is configured to receive, using the network interface, the transmission bit rate that is of the downlink data flow carrying a specified identifier and that is sent by the access network device, and the specified identifier is used to instruct the access network device to detect the transmission bit rate of the downlink data flow.

According to a seventh implementation of the second aspect, the specified identifier is generated by a PCEF entity or a TDF entity.

According to an eighth implementation of the second aspect, the processor is further configured to send third instruction information to the PCEF entity or the TDF entity using the network interface before receiving, using the network interface, the transmission bit rate that is of the downlink data flow and that is sent by the access network device, the third instruction information is used to instruct the PCEF entity or the TDF entity to identify the downlink data flow, and the identified downlink data flow carries the specified identifier.

According to a ninth implementation of the second aspect, the processor is configured to determine the quality of service policy when the transmission bit rate of the downlink data flow is less than a preset transmission bit rate.

According to a tenth implementation of the second aspect, the processor is configured to determine the quality of service policy when the transmission bit rate of the downlink data flow is less than a preset transmission bit rate and the channel quality is better than preset channel quality.

Beneficial effects of the technical solution provided in the embodiments of the present disclosure are as follows:

The transmission quality of the downlink data flow is obtained, and the quality of service policy for the downlink data flow is determined according to the transmission quality of the downlink data flow, so as to adjust the transmission quality of the downlink data flow. The obtained transmission quality of the downlink data flow can reflect an actual network environment. In this way, the PCRF entity can determine the quality of service policy according to the actual network environment. For example, when the transmission bit rate of the downlink data flow is relatively low, the quality of service policy is to improve the transmission bit rate of the downlink data flow, so as to improve the transmission quality of the downlink data flow and improve user experience.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

A terminal mentioned in the embodiments of the present disclosure may be a wireless terminal. The wireless terminal may be a device that provides a voice or data connectivity for a user, a handheld device with a radio connection function, or another processing device connected to a radio modem. The wireless terminal may communicate with one or more core networks using a RAN. The wireless terminal may be a mobile terminal such as a mobile phone (or referred to as a "cellular" phone), or a computer with a mobile terminal, for example, a portable, pocket-sized, handheld, computer built-in, or in-vehicle mobile apparatus, which exchanges a voice or data with the RAN. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, or a UE.

In the embodiments of the present disclosure, a downlink data flow is a data flow sent from a network side to a terminal.

Figure 1:
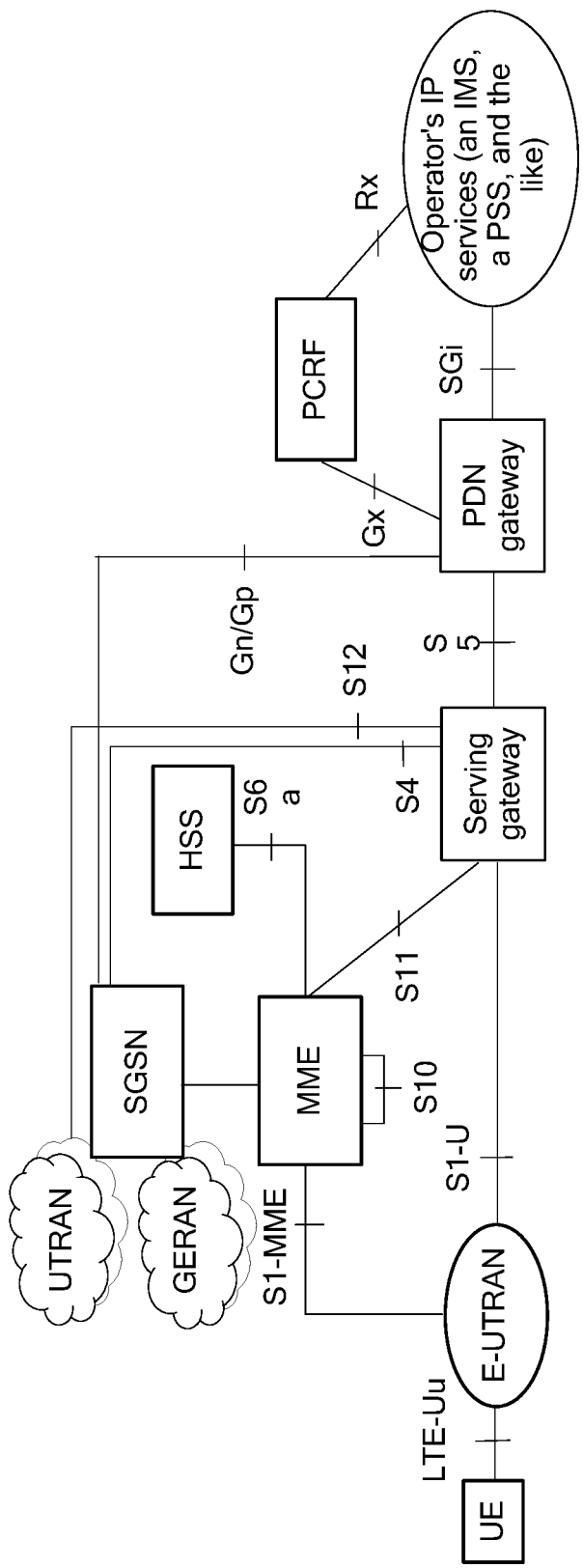
FIG. 1 is a schematic architectural diagram of a SAE network system in the prior art.
Figure 2:
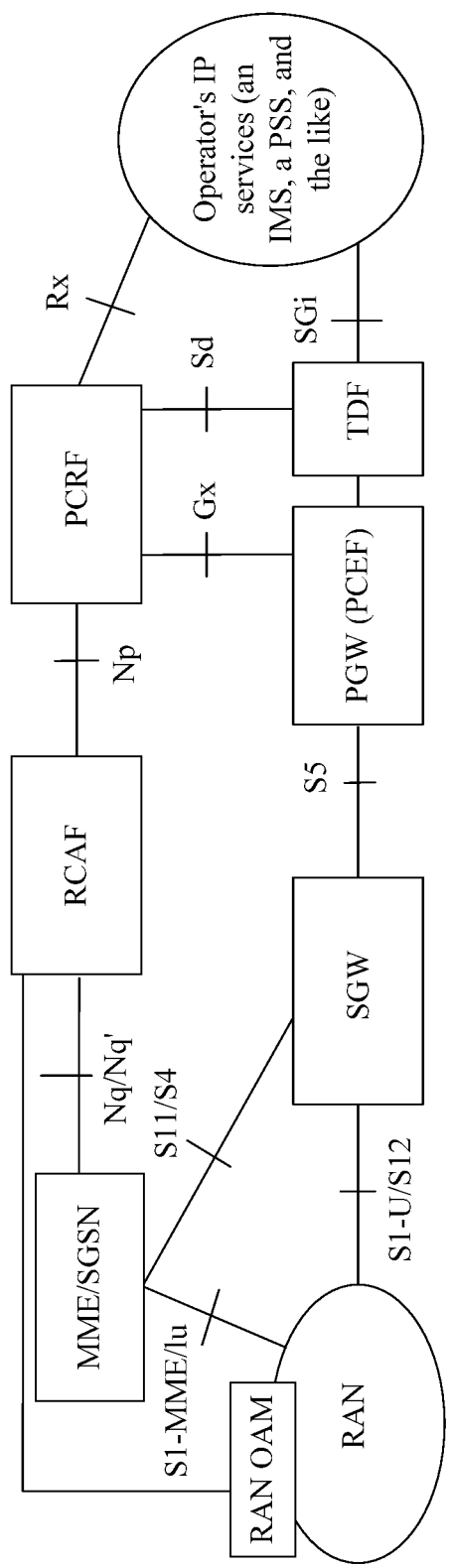
FIG. 2 is a schematic architectural diagram of a SAE network system with an RCAF entity.
Figure 3:
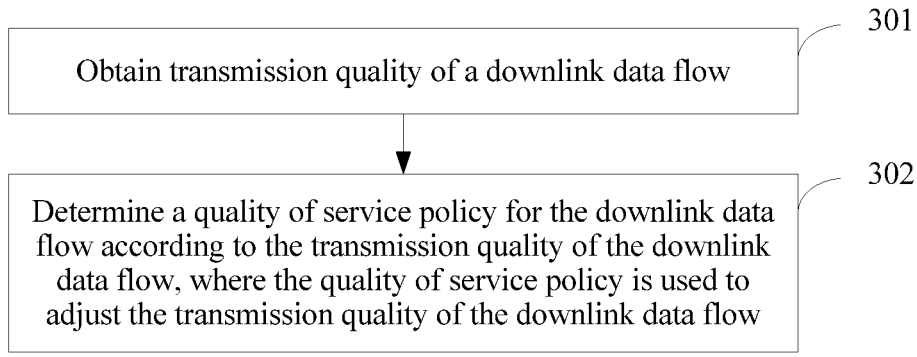
FIG. 3 is a flowchart of a policy determining method according to a first embodiment of the present disclosure.

FIG. 3 is a flowchart of a policy determining method according to a first embodiment of the present disclosure. As shown in FIG. 3, the method in this embodiment includes the following steps.

301. Obtain transmission quality of a downlink data flow.

Optionally, the transmission quality of the downlink data flow includes a transmission bit rate of the downlink data flow.

Optionally, the transmission bit rate of the downlink data flow may be detected by a core network device, for example, detected by a PGW, a PCEF entity, or a TDF entity. The PGW and the PCEF entity may be integrated into a network device. Step 301 may include: The PCRF entity receives the transmission bit rate that is of the downlink data flow and that is sent by the PGW, the PCEF entity, or the TDF entity. Therefore, when the PCRF entity determines a quality of service policy for the downlink data flow, only the core network device needs to participate, so that relatively small impact is exerted on an entire system.

Optionally, before receiving the transmission bit rate that is of the downlink data flow and that is sent by the PGW, the PCEF entity, or the TDF entity, the PCRF entity further sends first instruction information to the PGW, the PCEF entity, or the TDF entity. The first instruction information is used to instruct the PGW, the PCEF entity, or the TDF entity to detect the transmission bit rate of the downlink data flow.

Optionally, the transmission bit rate of the downlink data flow may be detected by an access network device, for example, detected by an evolved NodeB (eNodeB). Step 301 may include: A PCRF entity receives the transmission bit rate that is of the downlink data flow and that is sent by the access network device. Optionally, the downlink data flow carries a specified identifier. The specified identifier is used to instruct the access network device to detect the transmission bit rate of the downlink data flow. In this case, the detected transmission bit rate of the downlink data flow is relatively accurate, so that the PCRF entity can relatively accurately determine the quality of service policy. This improves the transmission quality of the downlink data flow and improves user experience.

Optionally, the specified identifier is generated by the PCEF entity or a TDF entity.

Optionally, before receiving the transmission bit rate that is of the downlink data flow and that is sent by the access network device, the PCRF entity further sends third instruction information to the PCEF entity or the TDF entity. The third instruction information is used to instruct the PCEF entity or the TDF entity to identify the downlink data flow, and the identified downlink data flow carries the specified identifier.

Optionally, the transmission quality of the downlink data flow further includes information of channel quality fed back to an access network device by a terminal that receives the downlink data flow. Step 301 may include: A PCRF entity receives the information of channel quality sent by the access network device. For example, the PCRF entity may receive the information of channel quality that is sent by the access network device using an RCAF entity, or the PCRF entity may receive the information of channel quality that is sent by the access network device using an MME.

Optionally, before receiving the information of channel quality sent by the access network device, the PCRF entity further sends second instruction information to the access network device. The second instruction information is used to instruct the access network device to report the information of channel quality.

Optionally, the information of channel quality includes a channel quality indicator (CQI).

Optionally, the downlink data flow may be a downlink data flow of a specified service type. For example, the service type may be a video service.

Optionally, the service type of the downlink data flow is specified by an operator, or the service type of the downlink data flow is specified by the terminal. For example, the PCRF entity may receive an acceleration request sent by the terminal. The acceleration request includes the service type of the downlink data flow.

302. Determine a quality of service policy for the downlink data flow according to the transmission quality of the downlink data flow, where the quality of service policy is used to adjust the transmission quality of the downlink data flow.

Optionally, the PCRF entity determines the quality of service policy for the downlink data flow when the transmission bit rate of the downlink data flow is less than a preset transmission bit rate.

Optionally, the PCRF entity determines the quality of service policy for the downlink data flow when the transmission bit rate of the downlink data flow is less than a preset transmission bit rate and channel quality is better than preset channel quality.

Optionally, the quality of service policy may be used to adjust the transmission bit rate of the downlink data flow. For example, the quality of service policy may be to increase or decrease the transmission bit rate according to a specific variation, or adjust the transmission bit rate to a target value.

Optionally, the quality of service policy may be used to adjust a transmission parameter of the downlink data flow. Optionally, a quality of service class identifier (QCI) may be used to indicate the transmission parameter of the downlink data flow. The QCI may include at least one of a transmission priority, a transmission delay, or a transmission packet loss rate, or the QCI may include another transmission parameter. This is not limited in this embodiment. Optionally, the quality of service policy is to adjust the QCI to a target value, so as to optimize the transmission quality. For example, the QCI before the adjustment may correspond to a relatively poor transmission parameter such as a relatively low transmission priority, a relatively long transmission delay, or a relatively high packet loss rate, and the target value obtained after the adjustment may correspond to a relatively good transmission parameter such as a relatively high transmission priority, a relatively short transmission delay, or a relatively low packet loss rate.

Optionally, the PCRF entity further sends the quality of service policy to the PCEF entity. For example, the PCRF entity may initiate an Internet Protocol-connectivity access network (IP-CAN) modification session, so that the PCEF entity obtains the quality of service policy and adjusts at least one of the transmission bit rate of the downlink data flow or the transmission parameter of the downlink data flow according to the quality of service policy.

The method in this embodiment is described below using an example of an application scenario. It is assumed that an operator specifies a transmission bit rate range of a downlink data flow of a service type and the range includes a minimum bit rate and a maximum bit rate. The PCRF entity may obtain transmission quality such as a transmission bit rate of the downlink data flow of the service type in real time. When the transmission bit rate of the downlink data flow of the service type is less than the minimum bit rate, the PCRF entity may push an acceleration notification to a terminal that receives the downlink data flow of the service type, to indicate that acceleration can be performed. The acceleration notification may be pushed using a short message service message. When receiving a feedback indicating that the terminal agrees with the acceleration, the PCRF entity may determine a quality of service policy. The quality of service policy is to adjust the transmission bit rate of the downlink data flow to a target value of the transmission bit rate. The target value may fall within the transmission bit rate range. Then, the PCRF entity sends the quality of service policy to the PCEF entity. Therefore, after the PCEF entity executes the quality of service policy, the transmission bit rate of the downlink data flow is improved.

In this embodiment, the PCRF entity obtains the transmission quality of the downlink data flow, and determines the quality of service policy for the downlink data flow according to the transmission quality of the downlink data flow, so as to adjust the transmission quality of the downlink data flow. The obtained transmission quality of the downlink data flow can reflect an actual network environment. In this way, the PCRF entity can determine the quality of service policy according to the actual network environment. For example, when the transmission bit rate of the downlink data flow is relatively low, the quality of service policy is to improve the transmission bit rate of the downlink data flow, so that the transmission quality of the downlink data flow can be improved and user experience can be improved.

Figure 4:
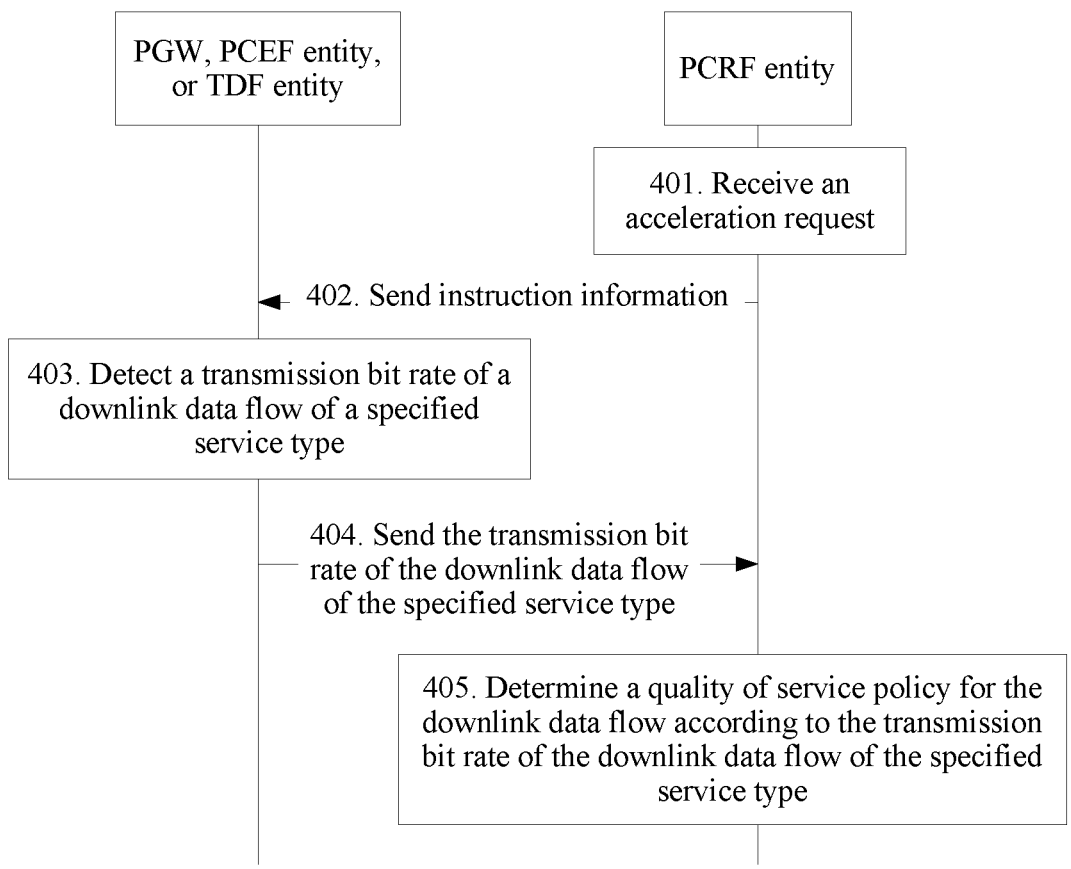
FIG. 4 is a schematic diagram of a policy determining method according to a second embodiment of the present disclosure.

FIG. 4 is a schematic diagram of a policy determining method according to a second embodiment of the present disclosure. In this embodiment, for content that is the same as or similar to the first embodiment, refer to detailed descriptions in the first embodiment. Details are not described herein again. As shown in FIG. 4, the method in this embodiment includes the following steps.

401. A PCRF entity receives an acceleration request.

Optionally, the PCRF entity receives the acceleration request sent by a terminal. The acceleration request includes a service type of a downlink data flow that the terminal requests to accelerate. After receiving the acceleration request, the PCRF entity may obtain the service type of the downlink data flow that is requested to be accelerated.

402. The PCRF entity sends instruction information to a PGW, a PCEF entity, or a TDF entity, where the instruction information is used to instruct the PGW, the PCEF entity, or the TDF entity to detect a transmission bit rate of a downlink data flow of a specified service type.

Optionally, the specified service type may be the service type of the downlink data flow that the terminal requests to accelerate.

403. After the PGW, the PCEF entity, or the TDF entity receives the instruction information sent by the PCRF entity, the PGW, the PCEF entity, or the TDF entity detects the transmission bit rate of the downlink data flow of the specified service type.

Optionally, before detecting the transmission bit rate of the downlink data flow of the specified service type, the PGW, the PCEF entity, or the TDF entity further recognizes the downlink data flow of the specified service type from all downlink data flows.

404. The PGW, the PCEF entity, or the TDF entity sends the transmission bit rate of the downlink data flow of the specified service type to the PCRF entity.

405. After the PCRF entity receives the transmission bit rate that is of the downlink data flow of the specified service type and that is sent by the PGW, the PCEF entity, or the TDF entity, the PCRF entity determines a quality of service policy for the downlink data flow according to the transmission bit rate of the downlink data flow of the specified service type, where the quality of service policy is used to adjust transmission quality of the downlink data flow.

In this embodiment, a specific implementation of step 405 is similar to that of step 302 in the first embodiment. Refer to detailed descriptions of step 302. Details are not described herein again.

It should be noted that step 401 and step 402 are optional steps. In specific implementations, steps 401 to 405 may be performed, or only steps 403 to 405 may be performed. When only steps 403 to 405 are performed, step 403 is as follows: A PGW, a PCEF entity, or a TDF entity periodically detects a transmission bit rate of a downlink data flow of a specified service type.

In this embodiment, the transmission bit rate of the downlink data flow is detected by the PGW, the PCEF entity, or the TDF entity. Therefore, when the PCRF entity determines the quality of service policy for the downlink data flow, only a core network device needs to participate, so that the transmission quality of the downlink data flow can be improved by using the quality of service policy while relatively small impact is exerted on an entire system, thereby improving user experience.

Figure 5:
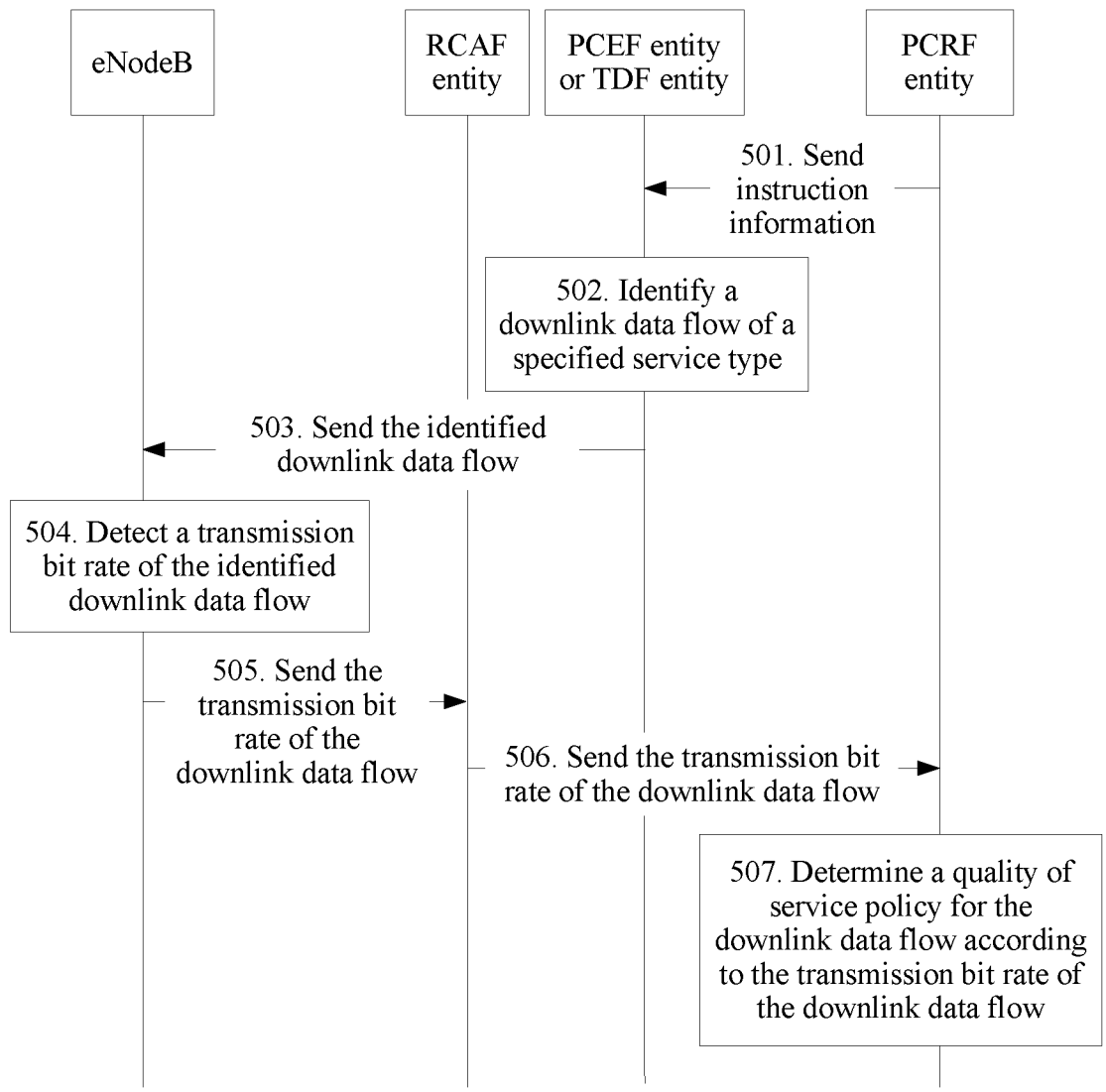
FIG. 5 is a schematic diagram of a policy determining method according to a third embodiment of the present disclosure.

FIG. 5 is a schematic diagram of a policy determining method according to a third embodiment of the present disclosure. In this embodiment, for content that is the same as or similar to the first embodiment, refer to detailed descriptions in the first embodiment. Details are not described herein again. As shown in FIG. 5, the method in this embodiment includes the following steps.

501. A PCRF entity sends instruction information to a PCEF entity or a TDF entity, where the instruction information is used to instruct the PCEF entity or the TDF entity to identify a downlink data flow of a specified service type.

Optionally, the instruction information includes the specified service type.

502. After the PCEF entity or the TDF entity receives the instruction information sent by the PCRF entity, the PCEF entity or the TDF entity identifies the downlink data flow of the specified service type.

Optionally, before identifying the downlink data flow of the specified service type, the PCEF entity or the TDF entity further recognizes, from all downlink data flows, the downlink data flow of the specified service type included in the instruction information.

Optionally, the PCEF entity or the TDF entity further generates a specified identifier. The identified downlink data flow carries the specified identifier generated by the PCEF entity or the TDF entity. The specified identifier is used to instruct an eNodeB to detect a transmission bit rate of the downlink data flow.

Optionally, the PCEF entity or the TDF entity may identify the downlink data flow of the specified service type in one of the following two manners. A first manner is applicable to a case in which the PCEF entity is separated from the TDF entity. A second manner is applicable to a case in which the PCEF entity is separated from the TDF entity and a case in which the PCEF entity is integrated with the TDF entity.

In the first manner, the TDF entity determines a value corresponding to the service type of the downlink data flow from a preset correspondence between a service type and a value; then recognizes the downlink data flow (for example, a downlink IP packet) of the specified service type; updates, to the value corresponding to the service type of the downlink data flow, a value of an inner differentiated services code point (DSCP) field of the recognized downlink IP packet of the specified service type; and then sends the updated downlink IP packet to the PCEF entity. After receiving the downlink IP packet, the PCEF entity first recognizes the downlink IP packet of the specified service type from the downlink IP packet according to the value of the DSCP field, and then re-identifies the downlink IP packet in a GPRS Tunneling Protocol-user plane (GTP-U) encapsulation manner. The specified identifier may be carried in a GTP-U header.

In the second manner, the PCEF entity or the TDF entity determines a value corresponding to the service type of the downlink data flow from a preset correspondence between a service type and a value; then recognizes the downlink data flow (for example, a downlink IP packet); and updates a value of an inner DSCP field of the downlink IP packet to the value corresponding to the service type of the downlink data flow. The specified identifier may be indicated by the value of the DSCP field.

503. The PCEF entity or the TDF entity sends the identified downlink data flow to an eNodeB.

504. After the eNodeB receives the identified downlink data flow sent by the PCEF entity or the TDF entity, the eNodeB detects a transmission bit rate of the identified downlink data flow.

Optionally, before detecting the transmission bit rate of the identified downlink data flow, the eNodeB further recognizes the identified downlink data flow from all downlink data flows.

Optionally, the eNodeB recognizes the identified downlink IP packet according to a GTP-U header in the downlink IP packet or the DSCP field of the downlink IP packet.

505. The eNodeB sends the transmission bit rate of the downlink data flow to an RCAF entity.

506. After the RCAF entity receives the transmission bit rate that is of the downlink data flow and that is sent by the eNodeB, the RCAF entity sends the transmission bit rate of the downlink data flow to the PCRF entity.

507. After the PCRF entity receives the transmission bit rate that is of the downlink data flow and that is sent by the RCAF entity, the PCRF entity determines a quality of service policy for the downlink data flow according to the transmission bit rate of the downlink data flow, where the quality of service policy is used to adjust transmission quality of the downlink data flow.

In this embodiment, a specific implementation of step 507 is similar to that of step 302 in the first embodiment. Refer to detailed descriptions of step 302. Details are not described herein again.

It should be noted that step 501 is an optional step. In specific implementations, steps 501 to 507 may be performed, or only steps 502 to 507 may be performed. When only steps 502 to 507 are performed, step 502 is as follows: A PCEF entity or a TDF entity identifies a downlink data flow of a specified service type.

In this embodiment, the transmission bit rate of the downlink data flow is detected by the eNodeB. Therefore, the detected transmission bit rate of the downlink data flow is relatively accurate, so that the PCRF entity can relatively accurately determine the quality of service policy. This improves the transmission quality of the downlink data flow and improves user experience.

Figure 6:
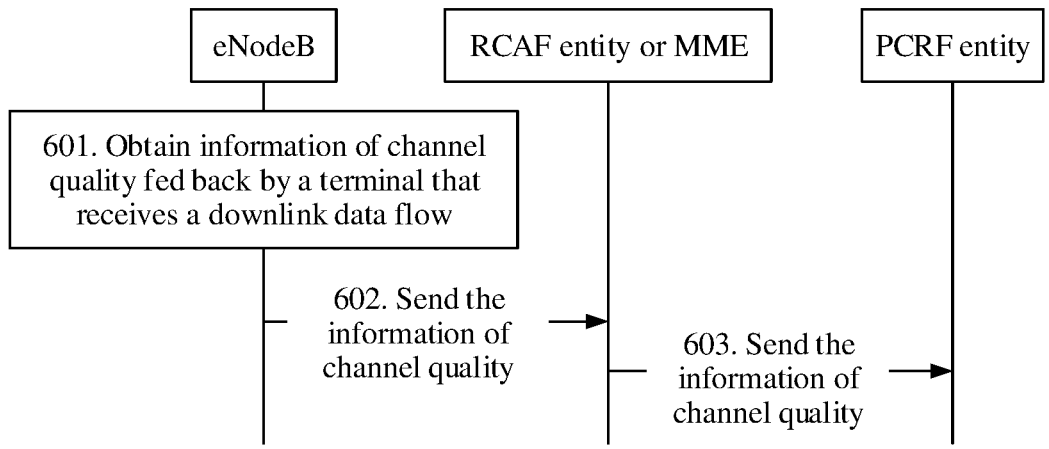
FIG. 6 is a schematic diagram of information of channel quality obtaining according to a fourth embodiment of the present disclosure.

FIG. 6 is a schematic diagram of information of channel quality obtaining according to a fourth embodiment of the present disclosure. In this embodiment, for content that is the same as or similar to the first embodiment, refer to detailed descriptions in the first embodiment. Details are not described herein again. As shown in FIG. 6, a method in this embodiment includes the following steps.

601. An eNodeB obtains information of channel quality fed back by a terminal that receives a downlink data flow.

Optionally, the eNodeB periodically obtains a CQI fed back by the terminal that receives the downlink data flow.

602. The eNodeB sends the information of channel quality to an RCAF entity or an MME.

603. After the RCAF entity or the MME receives the information of channel quality sent by the eNodeB, the RCAF entity or the MME sends the information of channel quality to a PCRF entity, and the PCRF entity receives the information of channel quality sent by the RCAF entity or the MME.

In this embodiment, the information of channel quality received by the PCRF entity is actively reported by the eNodeB, so that signaling overheads in a system are reduced.

Figure 7:
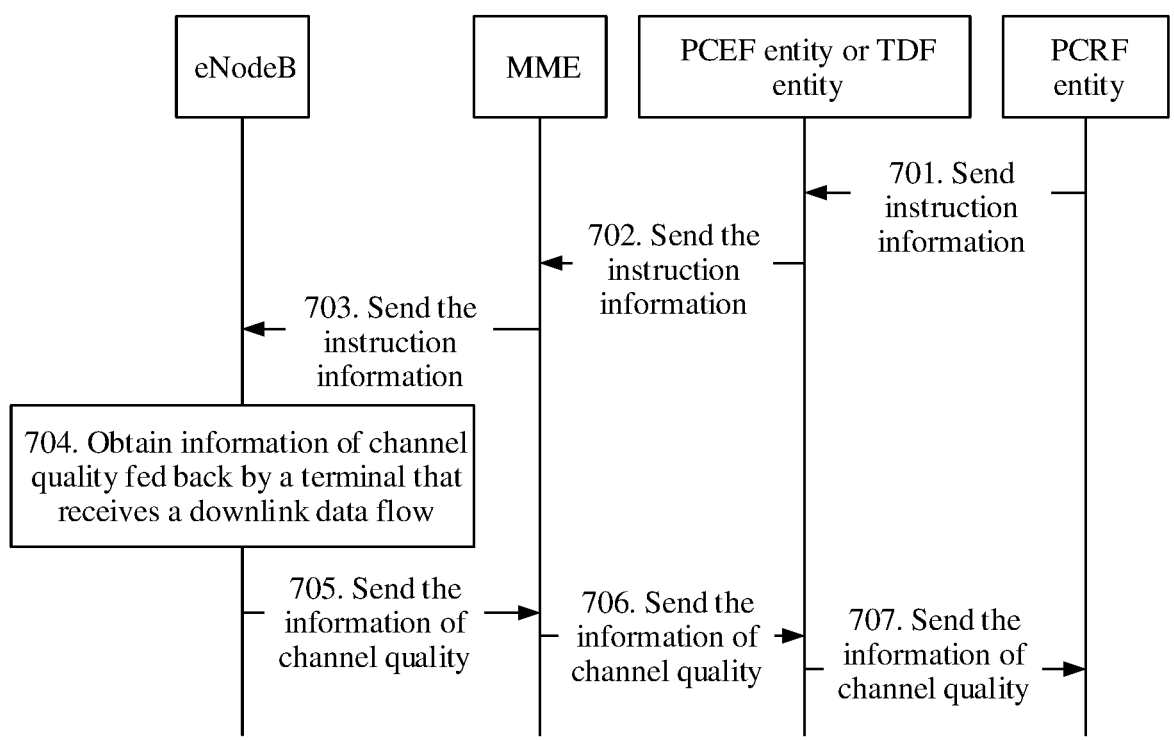
FIG. 7 is a schematic diagram of information of channel quality obtaining according to a fifth embodiment of the present disclosure.

FIG. 7 is a schematic diagram of information of channel quality obtaining according to a fifth embodiment of the present disclosure. In this embodiment, for content that is the same as or similar to the first embodiment, refer to detailed descriptions in the first embodiment. Details are not described herein again. As shown in FIG. 7, a method in this embodiment includes the following steps.

701. A PCRF entity sends instruction information to a PCEF entity or a TDF entity, where the instruction information is used to instruct an eNodeB to report information of channel quality fed back by a terminal that receives a downlink data flow.

Optionally, the instruction information includes an identifier of the terminal that receives the downlink data flow.

702. After the PCEF entity or the TDF entity receives the instruction information sent by the PCRF entity, the PCEF entity or the TDF entity sends the instruction information to an MME.

703. After the MME receives the instruction information sent by the PCEF entity or the TDF entity, the MME sends the instruction information to the eNodeB.

It should be noted that the PCRF entity, the PCEF entity, the TDF entity, and the MME may send the instruction information using an event subscription mechanism.

704. After the eNodeB receives the instruction information sent by the MME, the eNodeB obtains the information of channel quality fed back by the terminal that receives the downlink data flow.

Optionally, the eNodeB obtains a CQI fed back by the terminal that receives the downlink data flow. The terminal that receives the downlink data flow is a terminal identified by the identifier of the terminal that is included in the instruction information.

705. The eNodeB sends the information of channel quality to the MME.

706. After the MME receives the information of channel quality sent by the eNodeB, the MME sends the information of channel quality to the PCRF entity or the TDF entity.

707. After the PCEF entity or the TDF entity receives the information of channel quality sent by the MME, the PCEF entity or the TDF entity sends the information of channel quality to the PCRF entity, and the PCRF entity receives the information of channel quality sent by the PCEF entity or the TDF entity.

In this embodiment, the PCRF entity sends the instruction information to the eNodeB. After receiving the instruction information, the eNodeB sends the information of channel quality to the PCRF entity. Therefore, the PCRF entity can determine, according to an actual situation, whether the eNodeB needs to report the information of channel quality, so that a quality of service policy can be flexibly determined.

Figure 8:
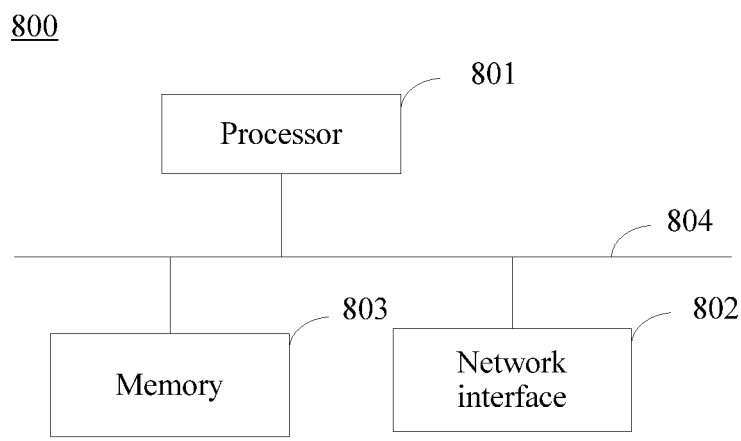
FIG. 8 is a schematic structural diagram of a policy determining apparatus according to a sixth embodiment of the present disclosure.

FIG. 8 is a schematic structural diagram of a policy determining apparatus according to a sixth embodiment of the present disclosure. In this embodiment, for content corresponding to the first embodiment, refer to detailed descriptions in the first embodiment. Details are not described herein again. In a specific implementation, an apparatus 800 shown in FIG. 8 may be a computer or a server. The apparatus 800 includes a processor 801 and a network interface 802. In a specific implementation, the apparatus 800 may include at least one processor 801 (for example, a CPU), at least one network interface 802 or another communications interface, a memory 803, and at least one communications bus 804. A person skilled in the art may understand that a structure of the server shown in FIG. 8 does not constitute any limitation to the server, and instead the server may include fewer or more parts than those shown in FIG. 8, or a combination of some parts, or parts disposed differently. For example, the apparatus 800 includes the processor 801 and the network interface 802.

Each integral part of the apparatus 800 is described below in detail with reference to FIG. 8.

The communications bus 804 is configured to implement connection and communication between the processor 801, the network interface 802, and the memory 803.

The at least one network interface 802 (which may be wired or wireless) implements communication and connection between the apparatus 800 and at least one other server (for example, a PCEF entity or a TDF entity) using the Internet, a wide area network, a local network, a metropolitan area network, or the like.

The memory 803 may be configured to store a software program and an application module. By running the software program and the application module that are stored in the memory 803, the processor 801 performs various functional applications of the apparatus 800 and processes data. The memory 803 may mainly include a program storage area and a data storage area. The program storage area may store an operating system, an application program that is required by at least one function (for example, determining a quality of service policy), and the like. The data storage area may store data (for example, storing a transmission bit rate of a downlink data flow) that is created according to use of the apparatus 800, and the like. In addition, the memory 803 may include a high-speed random access memory (RAM), and may further include a non-volatile memory, for example, at least one magnetic disk storage component, a flash memory component, or another volatile solid-state storage component.

The processor 801 is a control center of the apparatus 800, and uses various interfaces and lines to connect all parts of the entire apparatus. By running or performing the software program and/or the application module that are/is stored in the memory 803 and invoking the data stored in the memory 803, the processor 801 performs various functions of the apparatus 800 and processes data, so as to perform overall monitoring on the apparatus.

For example, by running or performing the software program and/or the application module that are/is stored in the memory 803 and invoking the data stored in the memory 803, the processor 801 is configured to: obtain transmission quality of a downlink data flow by using the network interface 802, and determine a quality of service policy for the downlink data flow according to the transmission quality of the downlink data flow. The quality of service policy is used to adjust the transmission quality of the downlink data flow.

Optionally, the processor 801 is configured to receive, by using the network interface 802, a transmission bit rate that is of the downlink data flow and that is sent by a PGW, a PCEF entity, or a TDF entity.

Optionally, the processor 801 is further configured to send first instruction information to the PGW, the PCEF entity, or the TDF entity using the network interface 802 before receiving, using the network interface 802, the transmission bit rate that is of the downlink data flow and that is sent by the PGW, the PCEF entity, or the TDF entity. The first instruction information is used to instruct the PCEF entity or the TDF entity to detect the transmission bit rate of the downlink data flow.

Optionally, the processor 801 is configured to receive, using the network interface 802, the transmission bit rate that is of the downlink data flow and that is sent by an access network device.

Optionally, the processor 801 is configured to receive, using the network interface 802, the transmission bit rate that is of the downlink data flow carrying a specified identifier and that is sent by the access network device. The specified identifier is used to instruct the access network device to detect the transmission bit rate of the downlink data flow.

Optionally, the processor 801 is further configured to send third instruction information to the PCEF entity or the TDF entity using the network interface 802 before receiving, using the network interface 802, the transmission bit rate that is of the downlink data flow and that is sent by the access network device. The third instruction information is used to instruct the PCEF entity or the TDF entity to identify the downlink data flow, and the identified downlink data flow carries the specified identifier.

Optionally, the processor 801 is further configured to receive, using the network interface 802, information of channel quality that is sent by an access network device and fed back to the access network device by a terminal that receives the downlink data flow. For example, the processor 801 is configured to receive, using the network interface 802, the information of channel quality that is sent by the access network device by using an RCAF entity or an MME.

Optionally, the processor 801 is further configured to send second instruction information to the access network device using the network interface 802 before receiving, using the network interface 802, the information of channel quality sent by the access network device. The second instruction information is used to instruct the access network device to report the information of channel quality.

Optionally, the processor 801 is configured to obtain transmission quality of a downlink data flow of a specified service type using the network interface 802.

Optionally, before obtaining the transmission quality of the downlink data flow of the specified service type by using the network interface 802, the processor 801 is further configured to receive, using the network interface 802, an acceleration request sent by the terminal. The acceleration request includes the service type of the downlink data flow.

Optionally, after determining the quality of service policy, the processor 801 is further configured to send the quality of service policy to the PCEF entity using the network interface 802.

Optionally, the processor 801 is configured to determine the quality of service policy for the downlink data flow when the transmission bit rate of the downlink data flow is less than a preset transmission bit rate.

Optionally, the processor 801 is specifically configured to determine the quality of service policy for the downlink data flow when the transmission bit rate of the downlink data flow is less than a preset transmission bit rate and channel quality is better than preset channel quality.

Optionally, the processor 801 is configured to perform a signal processing process of the PCRF entity in the methods shown in FIG. 3 to FIG. 7.

Optionally, the processor is a processing unit, and the memory is a storage unit.

In this embodiment, the processor obtains the transmission quality of the downlink data flow using the network interface, and determines the quality of service policy for the downlink data flow according to the transmission quality of the downlink data flow, so as to adjust the transmission quality of the downlink data flow. The obtained transmission quality of the downlink data flow can reflect an actual network environment. In this way, the processor can determine the quality of service policy according to the actual network environment. For example, when the transmission bit rate of the downlink data flow is relatively low, the quality of service policy is to improve the transmission bit rate of the downlink data flow, so that the transmission quality of the downlink data flow can be improved and user experience can be improved.

Figure 9:
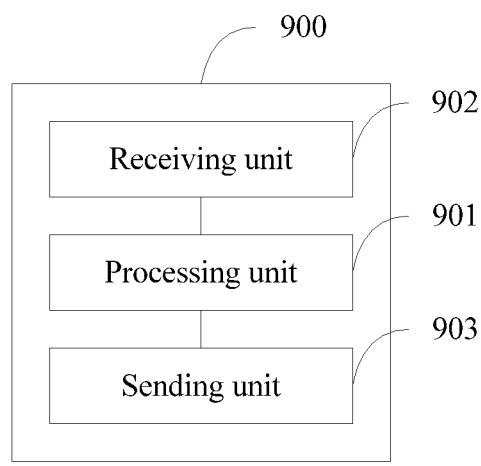
FIG. 9 is a schematic structural diagram of a policy determining apparatus according to a seventh embodiment of the present disclosure.

FIG. 9 is a schematic structural diagram of a policy determining apparatus according to a seventh embodiment of the present disclosure. In this embodiment, for content corresponding to the first embodiment, refer to detailed descriptions in the first embodiment. Details are not described herein again. The apparatus in this embodiment may be a PCRF entity. As shown in FIG. 9, an apparatus 900 in this embodiment includes a processing unit 901 (e.g., processor) and a receiving unit 902 (e.g., receiver device).

The receiving unit 902 is configured to obtain transmission quality of a downlink data flow.

Optionally, the receiving unit 902 is configured to receive a transmission bit rate that is of the downlink data flow and that is sent by a PGW, a PCEF entity, or a TDF entity.

Optionally, the receiving unit 902 is configured to receive a transmission bit rate that is of the downlink data flow and that is sent by an access network device.

Optionally, the receiving unit 902 is configured to receive the downlink data flow that carries a specified identifier and that is sent by an access network device. The specified identifier is used to instruct the access network device to detect a transmission bit rate of the downlink data flow.

Optionally, the receiving unit 902 is further configured to receive information of channel quality that is sent by an access network device and fed back to the access network device by a terminal that receives the downlink data flow.

Optionally, the apparatus 900 further includes: a sending unit 903 (e.g., transmitter device), configured to send first instruction information to the PGW, the PCEF entity, or the TDF entity before the receiving unit 902 receives the transmission bit rate that is of the downlink data flow and that is sent by the PGW, the PCEF entity, or the TDF entity. The first instruction information is used to instruct the PGW, the PCEF entity, or the TDF entity to detect the transmission bit rate of the downlink data flow.

Optionally, the sending unit 903 is further configured to send third instruction information to the PCEF entity or the TDF entity before the receiving unit 902 receives the transmission bit rate that is of the downlink data flow and that is sent by the access network device. The third instruction information is used to instruct the PCEF entity or the TDF entity to identify the downlink data flow, and the identified downlink data flow carries the specified identifier.

Optionally, the sending unit 903 is further configured to send second instruction information to the access network device before the receiving unit 902 receives the information of channel quality sent by the access network device. The second instruction information is used to instruct the access network device to report the information of channel quality.

The processing unit 901 is configured to determine a quality of service policy for the downlink data flow according to the transmission quality of the downlink data flow. The quality of service policy is used to adjust the transmission quality of the downlink data flow.

Optionally, the processing unit 901 is configured to determine the quality of service policy when the transmission bit rate of the downlink data flow is less than a preset transmission bit rate.

Optionally, the processing unit 901 is configured to determine the quality of service policy when the transmission bit rate of the downlink data flow is less than a preset transmission bit rate and channel quality is better than preset channel quality.

Optionally, the receiving unit 902 is configured to perform a signal receiving process of the PCRF entity in the methods shown in FIG. 3 to FIG. 7, the processing unit 901 is configured to perform a signal processing process of the PCRF entity in the methods shown in FIG. 3 to FIG. 5, and the sending unit 903 is configured to perform a signal sending process of the PCRF entity in the methods shown in FIG. 3 to FIG. 7.

It should be noted that: when the policy determining apparatus provided in the foregoing embodiments determines the policy, descriptions are provided only using an example of division of the foregoing functional modules. In actual application, the functions may be allocated to different functional modules for implementation as required. That is, an internal structure of the apparatus is divided into different functional modules to implement all or a part of the functions described above. In addition, the policy determining apparatus provided in the foregoing embodiments pertains to a same concept as the policy determining method embodiments. For a specific implementation process, refer to the method embodiments. Details are not described herein again.

A person of ordinary skill in the art may understand that all or some of the steps of the embodiments may be implemented by hardware or program instruction related hardware. The program may be stored in a computer-readable storage medium. The storage medium may be a read-only memory, a magnetic disk, or an optical disc.

The foregoing descriptions are merely example embodiments of the present disclosure, and are not intended to limit the present disclosure. Any modification, equivalent replacement, and improvement made without departing from the spirit and principle of the present disclosure shall fall within the protection scope of the present disclosure.

What is claimed is:

1. A policy determining method, wherein the method comprises: obtaining, by a policy and charging rules function (PCRF) entity, transmission quality of a downlink data flow, wherein obtaining the transmission quality comprises receiving:
   a transmission bit rate of the downlink data flow from: a packet data network gateway (PGW), a policy and charging enforcement function (PCEF) entity, or a traffic detection function (TDF) entity; and
   information of channel quality fed back to an access network device by a terminal that receives the downlink data flow, and
   wherein before receiving the information of channel quality from the access network device, the method further comprises sending, by the PCRF entity to the access network device, instruction information used to instruct the access network device to report the information of channel quality;
   determining, by the PCRF entity, a quality of service policy for the downlink data flow according to the transmission quality of the downlink data flow; and
   sending, by the PCRF entity to the PCEF entity, the quality of service policy that instructs the PCEF entity to adjust the transmission quality of the downlink data flow according to the determined quality of service policy.

2. The method according to claim 1, wherein before the receiving the transmission bit rate of the downlink data, the method further comprises:
   sending, by the PCRF entity to the PGW, the PCEF entity, or the TDF entity, instruction information used to instruct the PGW, the PCEF entity, or the TDF entity to detect the transmission bit rate of the downlink data flow.

3. The method according to claim 1, wherein the obtaining transmission quality of a downlink data flow comprises: receiving the transmission bit rate of the downlink data flow from the access network device.

4. The method according to claim 3, wherein the downlink data flow carries a specified identifier used to instruct the access network device to detect the transmission bit rate of the downlink data flow.

5. The method according to claim 4, wherein before the receiving the transmission bit rate that is of the downlink data flow and that is sent by an access network device, the method further comprises:
   sending, by the PCRF entity, instruction information used to instruct the PCEF entity or the TDF entity to identify the downlink data flow, and the identified downlink data flow carries the specified identifier.

6. The method according to claim 1, wherein the determining a quality of service policy for the downlink data flow according to the transmission quality of the downlink data flow comprises: determining the quality of service policy when: the transmission hit rate of the downlink data flow is less than a preset transmission bit rate, or the channel quality is better than a preset channel quality.

7. The method according to claim 1, wherein the determining a quality of service policy for the downlink data flow according to the transmission quality of the downlink data flow comprises: determining the quality of service policy when: the transmission bit rate of the downlink data flow is less than a preset transmission bit rate, and the channel quality is better than preset channel quality.

8. A policy determining apparatus, comprising: a processor and a network interface, and a memory storing instructions; and
the processor is coupled to the memory to execute the instructions, the instructions comprising:
instructions for obtaining transmission quality of a downlink data flow by receiving
a transmission bit rate of the downlink data flow from: a packet data network gateway (PGW), a policy and charging enforcement function (PCEF) entity, or a traffic detection function (TDF) entity; and
information of channel quality from an access network device fed back to the access network device by a terminal that receives the downlink data flow;
instructions for determining a quality of service policy for the downlink data flow according to a transmission quality of the downlink data flow when: the transmission bit rate of the downlink data flow is less than a preset transmission bit rate, and the channel quality is better than a preset channel quality, wherein the transmission quality includes: the transmission bit rate, and the information of channel quality; and
instructions for sending the quaky of service policy to the PCEF entity that instructs the PCEF entity to adjust the transmission quality of the downlink data flow according to the determined quality of service policy.

9. The apparatus according to claim 8, wherein the instructions further comprise:
instructions for sending instruction information to the PGW, the PCEF entity, or the TDF entity before receiving the transmission bit rate of the downlink data, wherein the instruction information is used to instruct the PGW, the PCEF entity or the TDF entity to detect the transmission bit rate of the downlink data flow.

10. The apparatus according to claim 8, wherein the instructions further comprise: instructions for sending instruction information to the access network device, wherein the instruction information is used to instruct the access network device to report the information of channel quality.

11. The apparatus according to claim 8, wherein, the instructions for obtaining transmission quality of a downlink data comprise: instructions for receiving a transmission bit rate of the downlink data flow from the access network device.

12. The apparatus according to claim 11, wherein the downlink data flow carries a specified identifier used to instruct the access network device to detect the transmission bit rate of the downlink data flow.

13. The apparatus according to claim 12, wherein the instructions further comprise: instructions for sending instruction information to the PCEF entity or the TDF entity before receiving the transmission bit rate of the downlink data flow from the access network device, wherein the instruction information is used to instruct the PCEF entity or the TDF entity to identify the downlink data flow, and the identified downlink data flow carries the specified identifier.

14. The apparatus according to claim 8, wherein the instructions for determining a quality of service policy for the downlink data flow comprise: instructions for determining the quality of service policy when: the transmission bit rate of the downlink data flow is less than a preset transmission bit rate, and the channel quality is better than a preset channel quality.

15. A policy determining method, wherein the method comprises:
obtaining, by a policy and charging rules function (PCRF) entity, transmission quality of a downlink data flow, wherein obtaining the transmission quality comprises receiving a transmission bit rate of the downlink data flow from an access network device, and wherein:
the downlink data flow carries a specified identifier used to instruct the access network device to detect the transmission bit rate of the downlink data flow; and
before receiving the transmission bit rate of the downlink data flow from the access network device, the method further comprises sending, by the PCRF entity to a policy and charging enforcement function (PCEF) entity or to a traffic detection function (TDF) entity, instruction information used to instruct the PCEF entity or the TDF entity to identify the downlink data flow, wherein the identified downlink data flow carries the specified identifier;
determining, by the PCRF entity, a quality of service policy for the downlink data flow according to the transmission quality of the downlink data flow; and
sending, by the PCRF entity to the PCEF entity, the quality of service policy that instructs the PCEF entity to adjust the transmission quality of the downlink data flow according to the determined quality of service policy.

* * * * *